United States Patent [19]

Niinivuo

[11] Patent Number: 4,469,726
[45] Date of Patent: Sep. 4, 1984

[54] DECORATIVE ILLUMINATION SETUP

[76] Inventor: Henrik Niinivuo, Peltopirtinkatu Kesäranta, Tampere 40, Finland

[21] Appl. No.: 448,919

[22] PCT Filed: Apr. 10, 1981

[86] PCT No.: PCT/FI81/00028
§ 371 Date: Dec. 9, 1982
§ 102(e) Date: Dec. 9, 1982

[87] PCT Pub. No.: WO82/03602
PCT Pub. Date: Oct. 28, 1982

[51] Int. Cl.³ .................. A01K 63/00; B44F 1/00
[52] U.S. Cl. ........................ 428/13; 40/160; 119/5; 362/806; 428/912.2
[58] Field of Search ............ 428/13, 912.2; 119/5; 40/160; 362/806

[56] References Cited

U.S. PATENT DOCUMENTS

| | | | |
|---|---|---|---|
| 2,565,553 | 8/1951 | Foley | 428/13 X |
| 4,371,345 | 2/1983 | Palmer et al. | 428/13 X |
| 4,373,282 | 2/1983 | Wragg | 428/13 X |
| 4,405,664 | 9/1983 | Talbert | 428/13 X |

FOREIGN PATENT DOCUMENTS

| | | | |
|---|---|---|---|
| 949956 | 9/1949 | France . | |
| 960459 | 4/1950 | France . | |
| 996901 | 12/1951 | France . | |
| 1139309 | 6/1957 | France . | |
| 1604797 | 1/1972 | France . | |
| 2199698 | 4/1974 | France . | |
| 151596 | 7/1951 | Sweden . | |
| 301086 | 8/1954 | Switzerland . | |
| 1431439 | 4/1976 | United Kingdom | 428/13 |

Primary Examiner—Henry F. Epstein
Attorney, Agent, or Firm—Pollock, Vande Sande & Priddy

[57] ABSTRACT

A decorative illumination setup designed to be used on wall surfaces of a room includes two background boards at different angles to a surface glass plate so as to create a three dimensional impression. A silhouetted picture is fitted in front of the background boards and an illumination apparatus is placed behind the silhouette. The illumination apparatus directs light onto the background boards from where the light is reflected into the room. Scenery may be placed on the background boards and/or the surface plate. The silhouetted picture is seen from the room as a silhouette with light passing through its outlines and openings.

10 Claims, 2 Drawing Figures

DECORATIVE ILLUMINATION SETUP

TECHNICAL FIELD

The invention is concerned with a decorative illumination setup.

BACKGROUND OF THE INVENTION

The combination introduces new aesthetic alternatives for the use of the wall surfaces of homes, ball rooms, and the like. A pleasant and extraordinary illumination will simultaneously be produced into such places. For example horizontal sceneries are suitable themes for the picture.

The invention is characterized by what is stated in the patent claim.

BRIEF DESCRIPTION OF THE DRAWING

The invention is described in the following description of the best mode embodiment which refers to the enclosed drawing where.

BEST MODE FOR CARRYING OUT THE INVENTION

Figure 1:
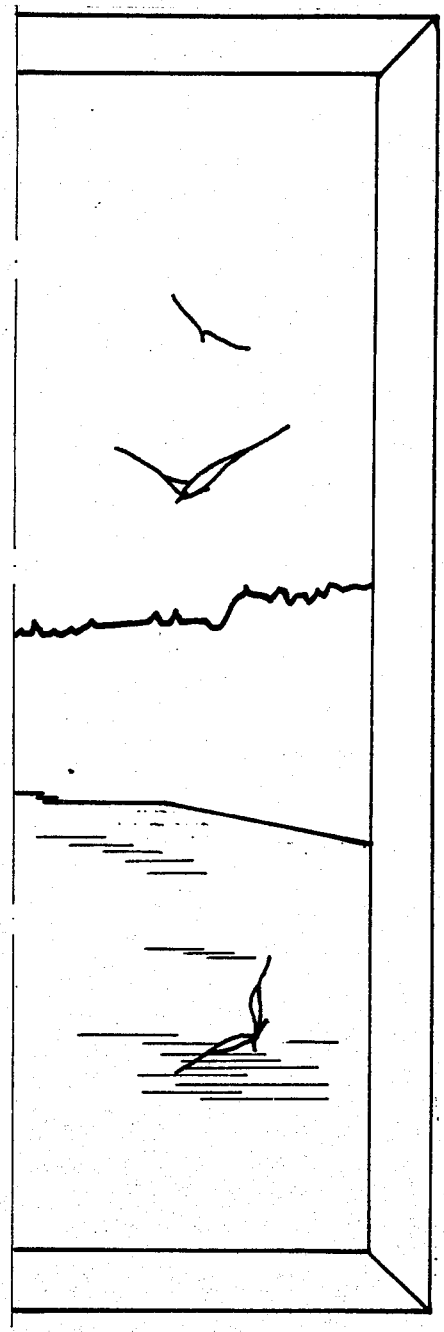
FIG. 1 shows a front view of a part of a decorative illumination setup according to the invention.
Figure 2:
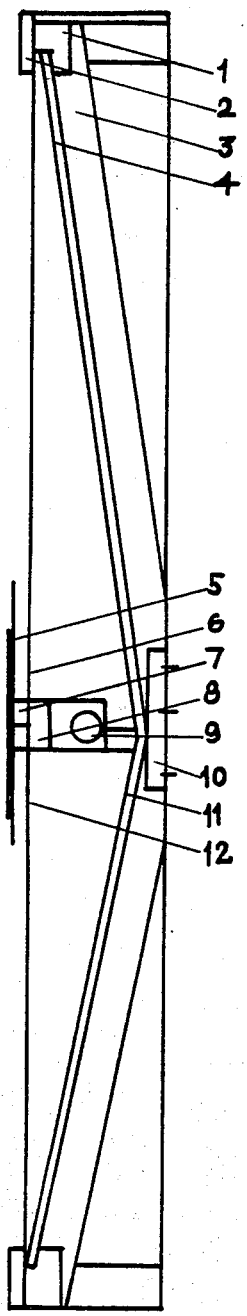
FIG. 2 shows a cross-section of the setup according to the invention.

The setup is an entity assembled of separate parts. It includes a background board having two parts 4 and 11 which parts are at different angles to the surface glass 6, 12. This creates a three-dimensional impression. A silhouetted picture 5 is placed in front of the surface glass 6, 12. The silhouette can be made of copper or other sheet metal, colored plastic, or the like. The illumination apparatus 9, preferably fluorescent tubes, is installed behind the silhouette picture. The tubes 9 will direct the light to the colique background boards 4 and 11, from where it will be reflected back into the room. Thus the scenery or other picture 5 will be seen in the room as a silhouette as the light passes through its outlines and openings. Cloud formations and the like may be painted on the background board 4. The lower part of the picture glass can be replaced also by an aquarium. The most suitable surface glass (6, 12) is frosted or other special glass.

The following is a list of the parts of the setup; the numbers refer to the numerical part designations in the Figures.

1 is the body of the setup, 2 is the frame, 3 is the supporting rack, 4 is the upper background or painting board, 5 is the silhouette picture made of copper or other sheet material, 6 is the upper part of the surface glass, 7 are the bolt plates, 8 is the supporting structure, 9 is the fluorescent tube, 10 is a support, 11 is the lower background surface or painting board, 12 is the lower part of the surface glass.

The form of realization of the invention may vary within the limits of the following claim.

I claim:

1. A decorative illumination setup for use in a room comprising:
   a setup body supporting two background boards;
   a surface plate of glass and a silhouette picture each arranged in spaced relation to said background boards;
   an illumination apparatus positioned behind said silhouette picture and between said surface plate and said background boards so that light from said illumination apparatus will be silhouetted by said silhouette picture and reflected from said background boards through said surface plate into the room; and,
   means for supporting said surface plate, said silhouette picture and said illumination apparatus on said setup body along with said two background boards, said background boards being at different angles in relation to said surface plate so as to create a three dimensional impression.

2. The illumination setup of claim 1 in which said surface plate is made of decorative glass.

3. The illumination setup of claim 2 in which said decorative glass is frosted glass.

4. The illumination setup of claim 1 in which scenery is painted on said background boards.

5. The illumination setup of claim 1 in which said silhouette picture is made of copper or other sheet metal.

6. The illumination setup of claim 1 in which said silhouette picture is made of plastic sheet.

7. The illumination setup of claim 1 in which said surface plate is positioned between said silhouette picture and said background boards.

8. The illumination setup of claim 1 in which said illumination apparatus comprises a fluorescent tube.

9. The illumination setup of claim 1 in which a portion of said surface plate is included in an aquarium.

10. The illumination setup of claim 1 in which said surface plate is comprised of two parts each of a different decorative glass.

* * * * *